Feb. 1, 1927.
J. A. MOORE
1,615,993
SHOCK ABSORBING SNUBBING DEVICE FOR VEHICLES
Filed Dec. 7, 1925
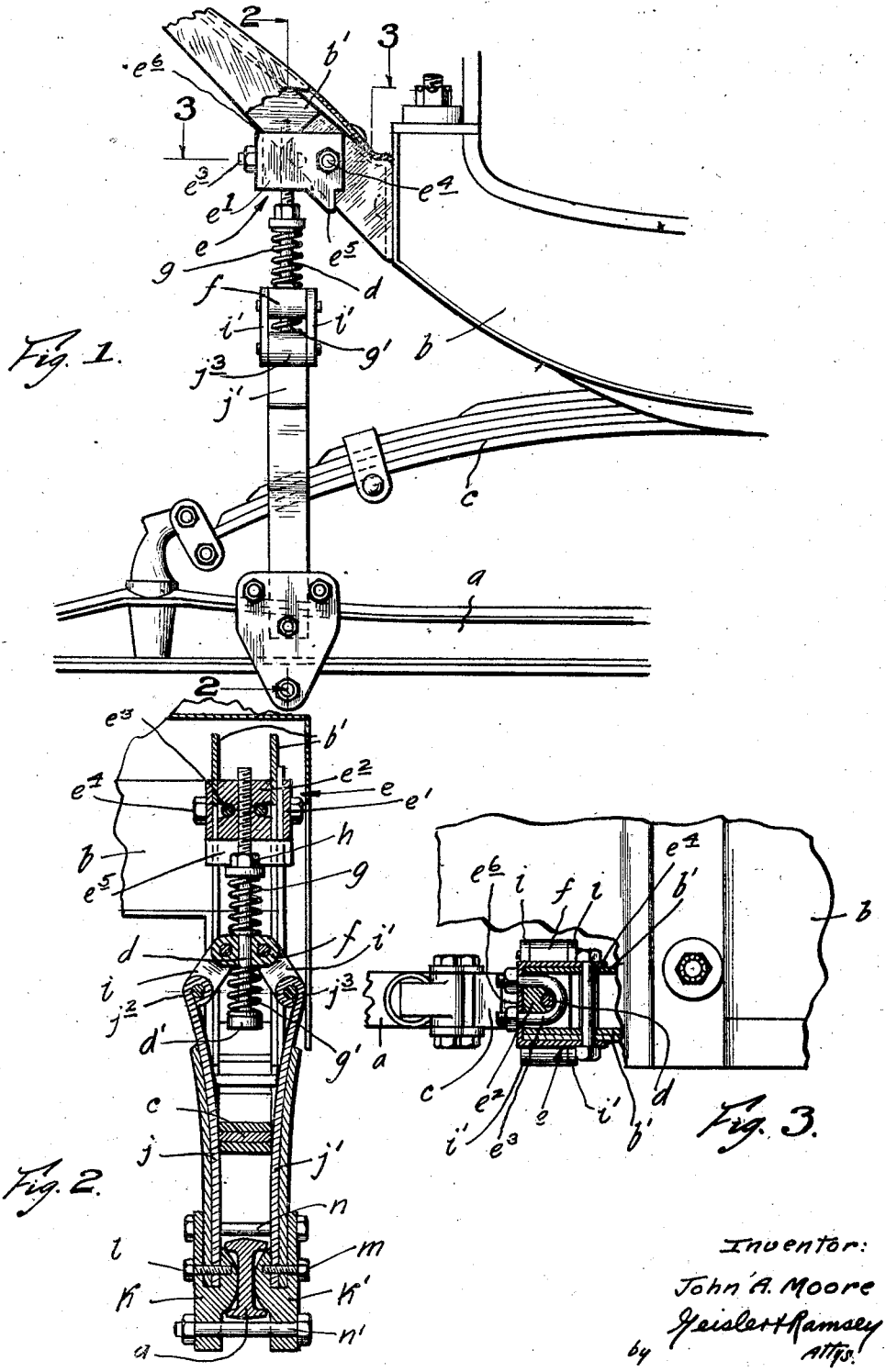
Inventor:
John A. Moore
by Geisler & Ramsey
Attys.

Patented Feb. 1, 1927.

1,615,993

UNITED STATES PATENT OFFICE.

JOHN A. MOORE, OF GERVAIS, OREGON.

SHOCK-ABSORBING SNUBBING DEVICE FOR VEHICLES.

Application filed December 7, 1925. Serial No. 73,800.

The object of my invention is to provide an efficient shock absorber and snubber of simple and inexpensive construction, and particularly adapted for spring mounted motor vehicles.

I attain my object in a combination comprising complementary leaf springs secured at one end to the axle of the vehicle, and a member arranged longitudinally with, and centrally between the other end of said leaf-springs, and means for securing said member to the body of the vehicle, a piece movable longitudinally on said member, an operative connection between said piece and the adjacent end of the leaf-springs, and a spring element normally, but yieldingly positioning said piece.

The details of construction and mode of operation of my device are hereinafter fully described with reference to the accompanying drawings, in which:

Fig. 1 is a fragmentary elevation of a vehicle with my combined shock absorber and snubber connecting the body and the axle thereof across one end of a load carrying spring;

Fig. 2 is a longitudinal section through my combined shock absorber and snubber showing the details thereof, said section being taken on the line 2—2 in Fig. 1; and Fig. 3 is a transverse section taken on the line 3—3 in Fig. 1 showing the fastening means of my invention to the body of the vehicle.

My combined shock absorber and snubber is adapted to be mounted on the axle $a$ and fixed to the body $b$ of any spring vehicle. In the drawings I show that the upper end of my device is connected to one fender bracket $b'$ of the body. My improved device comprises a pendent guide rod $d$ carried by the upper mounting $e$ and threaded in the latter and thus the relative length can be adjusted by varying the length of the engagement of the threaded portion of the rod providing a means of adjustment to any type of spring vehicle.

A sleeve $f$ is mounted upon said guide rod $d$ and is held between the coil springs $g$ and $g'$. One end of the spring $g$ bears against the nut $h$ threaded on the rod $e$ and the opposite end thereof bears against the sleeve $f$. The spring $g'$ is mounted between said sleeve $f$ and the enlarged end or head $d'$ of said guide rod $e$.

Said sleeve carries links $i$ and $i'$ at opposite sides and said links are fastened to eyes $j^2$ and $j^3$ formed in the free ends of the laminated spring elements $j$ and $j'$. The opposite ends of springs $j$ and $j'$ are fastened in the mounting halves $k$ and $k'$ which constitute the lower mounting element and are held together by studs $l$ and $m$. The halves $k$ and $k'$ clip the axle $a$ as shown in Fig. 2 and are connected together by bolts $n$ and $n'$. Said bolts pass above and below said axle and thus the eyes $j^2$ and $j^3$, formed in the free ends of the spring elements of $j$ and $j'$ respectively, may be adjusted by varying the relative lengths of the bolts $n$ and $n'$ thus providing means for varying the resiliency of said springs. The tension of the springs $g$ and $g'$ may be adjusted by the nut $h$.

The upper mounting $e$ is adapted to the particular vehicle to be equipped with my improved device. In the accompanying drawings said mounting is shown as being fastened to the fender bracket $b'$ and said body. Said fender bracket is substantially U shaped in section and the upper mounting comprises a U-shaped clip $e'$ in which a block $e^2$ in Fig. 2 is fastened by means of a U-bolt $e^3$. Said U-bolt passes about the pendent guide rod $d$ and thus any major adjustments of the latter may be made by loosening the U-bolt and permitting the guide rod $d$ to be moved longitudinally thereof.

In operation on a vehicle equipped with my shock absorber and snubber, a light shock, as for instance crossing a car track, will slightly compress the spring $g$, and the reflex action will be retarded by the compression of the spring $g'$. When subjected to a heavy shock, the spring $g$ will be compressed, and the force will be transmitted to the leaf springs $j$ and $j'$ through the links $i$ and $i'$, which will tend to force them apart, providing additional means of absorbing the shock. The reflex action is also in this case retarded by the spring $g'$, which will be compressed more or less in proportion to the severity of the shock, and tend to absorb all reflex actions.

With my arrangement of springs, whereby their actions are rendered reciprocating, the body $b$ is resting on a cushioned support in which an equilibrium will always be maintained between the upward and downward thrusts; thus providing very smooth and easy riding properties.

I claim:

1. A shock absorber comprising a laterally yielding spring-element arranged in U-form, a member arranged longitudinally with and centrally between the extremities of said spring-element, means for securing said spring-element and said member to the axle and the body of the vehicle respectively, a piece movable longitudinally on said member, links connecting said piece with the adjacent ends of the said spring element, and an auxiliary spring-element normally, but yieldingly positioning said piece on said member.

2. A shock absorber comprising a laterally yielding spring-element arranged in U-form, a member arranged longitudinally with and centrally between the extremities of said spring-element, means for securing said spring element and said member to the axle and the body of the vehicle respectively, a piece movable longitudinally on said member, links connecting said piece with the adjacent ends of the said spring element, an auxiliary spring-element normally, but yieldingly positioning said piece on said member, and means for adjusting the tension of the auxiliary spring element.

3. A shock absorber comprising, a pair of spaced complementary leaf-springs, a member arranged longitudinally with, and centrally between the free extremities of said leaf-springs; means for securing said leaf-springs and said member to the axle and the body of the vehicle respectively, a piece movable longitudinally on said member, links connecting said piece with the adjacent ends of the said leaf springs, a spring element normally, but yieldingly, positioning said piece on said member.

4. A shock absorber comprising, a pair of spaced complementary leaf-springs, a member arranged longitudinally with, and centrally between the free extremities of said leaf-springs; means for securing said leaf-springs and said member to the axle and the body of the vehicle respectively, a piece movable longitudinally on said member, links connecting said piece with the adjacent ends of the said leaf-springs, a spring located and bearing on each side of said piece, and normally, but yieldingly, positioning the latter.

5. A shock absorber comprising a pair of spaced complementary leaf-springs, a member arranged longitudinally with, and centrally between the free extremities of said leaf-springs; means for securing said leaf-springs and said member to the axle and the body of the vehicle respectively, a piece movable longitudinally on said member, links connecting said piece with the adjacent ends of the said leaf-springs, and a coil spring located and bearing on each side of said piece, and normally, but yieldingly, positioning the latter.

6. A shock absorber comprising a pair of spaced complementary leaf-springs, a member arranged longitudinally with, and centrally between the free extremities of said leaf-springs; means for securing said leaf-springs and said member to the axle and the body of the vehicle respectively, a piece movable longitudinally on said member, links connecting said piece with the adjacent ends of the said leaf-springs, a spring-element normally, but yieldingly, positioning said piece on said member, and means for adjusting the tension of the latter spring.

7. A shock absorber comprising a rod, said rod provided with a shoulder at one end, an adjustable nut threaded on the opposite end of the rod, a sleeve on said rod between said shoulder and said nut, a coil spring between said sleeve and said shoulder, and another coil spring between said sleeve and said nut, complementary spaced leaf-springs, links connecting the other ends of the leaf-springs, respectively, with said sleeve, and means for securing the said rod and said leaf-springs to the body and the axle of the vehicle, respectively.

8. In a vehicle having an axle and a spring mounted body carried thereby, a tying connection between said body and said axle said connection comprising a pendent member, a sleeve reciprocally carried thereby, links carried by said sleeve, a laterally resilient spring element connected to said links, said spring element and said pendent member being connected to said body and said axle respectively, whereby the action of the load carrying springs of the vehicle is resisted by said laterally resilient spring element.

9. In a vehicle having an axle and a spring mounted body carried thereby, a tying connection between said body and said axle said connection comprising a pendent member, a sleeve reciprocally carried thereby, links carried by said sleeve, a pair of spaced complementary leaf springs connected to said links, said leaf springs and said pendent member being connected to said body and said axle respectively, whereby the action of the load carrying springs of the vehicle is resisted by said leaf springs.

JOHN A. MOORE.